US012545580B2

(12) United States Patent
Thellefsen et al.

(10) Patent No.: US 12,545,580 B2
(45) Date of Patent: Feb. 10, 2026

(54) METHOD FOR PRODUCTION OF ELEMENTAL SULFUR AND SULFURIC ACID

(71) Applicant: HALDOR TOPSØE A/S, Kgs. Lyngby (DK)

(72) Inventors: Morten Thellefsen, Hillerød (DK); Mads Lykke, Brønshøj (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 1143 days.

(21) Appl. No.: 17/606,642

(22) PCT Filed: Apr. 29, 2020

(86) PCT No.: PCT/EP2020/061937
§ 371 (c)(1),
(2) Date: Oct. 26, 2021

(87) PCT Pub. No.: WO2020/225061
PCT Pub. Date: Nov. 12, 2020

(65) Prior Publication Data
US 2022/0227625 A1    Jul. 21, 2022

(30) Foreign Application Priority Data

May 3, 2019  (DK) .......................... PA 2019 00543
May 28, 2019 (DK) .......................... PA 2019 00655
(Continued)

(51) Int. Cl.
*C01B 17/04*    (2006.01)
*B01D 53/14*    (2006.01)
(Continued)

(52) U.S. Cl.
CPC ...... *C01B 17/0404* (2013.01); *B01D 53/1481* (2013.01); *B01D 53/1493* (2013.01);
(Continued)

(58) Field of Classification Search
None
See application file for complete search history.

(56) References Cited

U.S. PATENT DOCUMENTS 3,617,221 A    11/1971  Egan et al.
4,070,424 A     1/1978  Olson et al.
(Continued)

FOREIGN PATENT DOCUMENTS

CN    105692563 A     6/2016
CN    106219499 A    12/2016
(Continued)

OTHER PUBLICATIONS

CN 108786441 A—English Translation (Year: 2018).*
(Continued)

*Primary Examiner* — Colin W. Slifka
(74) *Attorney, Agent, or Firm* — Boone IP Law

(57) ABSTRACT

A process for production of elemental sulfur from a feedstock gas including from 15% to 100 vol % H2S and a stream of sulfuric acid, the process including: a) providing a Claus reaction furnace feed stream substoichiometric oxygen with respect to the Claus reaction, b) directing to a reaction furnace zone operating at elevated temperature such as above 900° C., c) directing to a sulfuric acid evaporation zone downstream said reaction furnace zone, d) cooling to provide a cooled Claus converter feed gas, e) directing to contact a material catalytically active in the Claus reaction, f) withdrawing a Claus tail gas and elemental sulfur, g) directing to a Claus tail gas treatment plant, with the associated benefit of a process involving injection of sulfuric acid in a sulfuric acid evaporation zone allowing high temperature combustion of said feedstock gas, including impurities, without cooling from evaporation and decomposition of sulfuric acid.

18 Claims, 5 Drawing Sheets

(30) Foreign Application Priority Data

Jun. 4, 2019 (DK) .......................... PA 2019 00681
Jun. 5, 2019 (DK) .......................... PA 2019 00687

(51) Int. Cl.

| | |
|---|---|
| *B01D 53/86* | (2006.01) |
| *B01J 19/00* | (2006.01) |
| *B01J 19/24* | (2006.01) |
| *C01B 17/02* | (2006.01) |
| *C01B 17/76* | (2006.01) |
| *C01B 17/775* | (2006.01) |
| *C01B 17/80* | (2006.01) |
| *F23G 7/06* | (2006.01) |

(52) U.S. Cl.
CPC ...... *B01D 53/8615* (2013.01); *B01J 19/0013* (2013.01); *B01J 19/2405* (2013.01); *B01J 19/2465* (2013.01); *C01B 17/0253* (2013.01); *C01B 17/0447* (2013.01); *C01B 17/0452* (2013.01); *C01B 17/0456* (2013.01); *C01B 17/76* (2013.01); *C01B 17/775* (2013.01); *C01B 17/80* (2013.01); *C01B 17/806* (2013.01); *F23G 7/06* (2013.01); *B01D 2255/20723* (2013.01); *B01J 2219/00157* (2013.01); *C01P 2006/80* (2013.01); *F23G 2209/14* (2013.01)

(56) References Cited

U.S. PATENT DOCUMENTS

| | | | |
|---|---|---|---|
| 4,208,192 | A | 6/1980 | Quigley et al. |
| 4,826,670 | A | 5/1989 | Hegarty |
| 5,278,123 | A | 1/1994 | Chopin et al. |
| 6,056,936 | A | 5/2000 | Nougayrede et al. |
| 2009/0226353 | A1 | 9/2009 | Tekie et al. |
| 2017/0044015 | A1 | 2/2017 | Rameshni et al. |
| 2022/0177306 | A1 | 6/2022 | Thellefsen et al. |
| 2022/0177307 | A1 | 6/2022 | Thellefsen et al. |
| 2022/0234891 | A1 | 7/2022 | Thellefsen et al. |

FOREIGN PATENT DOCUMENTS

| | | | | |
|---|---|---|---|---|
| CN | 107311117 | A | 11/2017 | |
| CN | 207468199 | U | 6/2018 | |
| CN | 108786441 | A * | 11/2018 | ............. B01D 53/22 |
| DE | 2430909 | A1 | 1/1976 | |
| EP | 0134594 | A1 | 3/1985 | |
| EP | 0561521 | A1 * | 9/1993 | ............. C01B 17/58 |
| EP | 0633219 | A1 | 1/1995 | |
| EP | 2878358 | A1 | 6/2015 | |
| EP | 2878367 | A1 | 6/2015 | |
| JP | S5124574 | A | 2/1986 | |
| RU | 2012138294 | A | 5/2014 | |
| WO | 2012089776 | A1 | 7/2012 | |
| WO | 2012152919 | A1 | 11/2012 | |
| WO | 2016198369 | A1 | 12/2016 | |
| WO | 2017220655 | A1 | 12/2017 | |
| WO | 2018096178 | A1 | 5/2018 | |
| WO | 2018169903 | A1 | 9/2018 | |

OTHER PUBLICATIONS

Danish Search Report issued Dec. 4, 2019 by the Danish Patent and Trademark Office in corresponding Danish Patent Application No. PA 2019 00681. (9 pages).

Danish Search Report issued Dec. 6, 2019 by the Danish Patent and Trademark Office in corresponding Danish Patent Application No. PA 2019 00687. (9 pages).

Danish Search Report issued Oct. 29, 2019 by the Danish Patent and Trademark Office in corresponding Danish Patent Application No. PA 2019 00655. (10 pages).

Danish Search Report issued Oct. 9, 2019 by the Danish Patent and Trademark Office in corresponding Danish Patent Application No. PA 2019 00543. (10 pages).

International Search Report (PCT/ISA/210) and Written Opinion (PCT/ISA/237) mailed on Jul. 17, 2020, by the European Patent Office as the International Searching Authority for International Application No. PCT/EP2020/061934. (12 pages).

International Search Report (PCT/ISA/210) and Written Opinion (PCT/ISA/237) mailed on Jul. 14, 2020; by the European Patent Office as the International Searching Authority for International Application No. PCT/EP2020/061940. (9 pages).

International Search Report (PCT/ISA/210) and Written Opinion (PCT/ISA/237) mailed on Jul. 29, 2020, by the European Patent Office as the International Searching Authority for International Application No. PCT/EP2020/061939. (9 pages).

International Search Report (PCT/ISA/210) and Written Opinion (PCT/ISA/237) mailed on Jun. 29, 2020, by the European Patent Office as the International Searching Authority for International Application No. PCT/EP2020/061937. (8 pages).

Office Action with English translation mailed on Oct. 10, 2023, by the Russian Federation for Russian Application No. 2021135473/04, 14 pages.

* cited by examiner

METHOD FOR PRODUCTION OF ELEMENTAL SULFUR AND SULFURIC ACID

The present invention is related to a process for conversion of $H_2S$ to elemental sulfur and sulfuric acid, optionally with an adjustable ratio between elemental sulfur and sulfuric acid.

$H_2S$ is a common side product in many processes, including hydrodesulfurization of refinery streams, natural gas processing and production of viscose fibres. It is desirable to convert $H_2S$ prior to emission to the atmosphere as $H_2S$ is highly toxic, odorous and an environmental challenge.

Refinery processes, besides producing the well-known high concentration $H_2S$ gas, may often also produce a so-called sour water stripper gas, which comprises $H_2S$, $H_2O$ and $NH_3$ in almost equal amounts.

Especially in refineries, the chosen process for $H_2S$ abatement has been the Claus process, which has been known and optimized for more the 8 decades. The Claus process proceeds by sub-stoichiometric combustion of $H_2S$ producing $SO_2$ in a Claus re-action furnace, providing a Claus converter feed gas. The subsequent Claus process will convert $H_2S$ and $SO_2$ to form elemental sulfur, which may be condensed and withdrawn.

Typically, the removal efficiency of the Claus process is 95% to 98%, which is insufficient for environmental compliance. Therefore, it is common practice to provide a tail gas treatment after the Claus process to provide sulfur abatement above 99%. The tail gas treatment is often a sulfuric acid plant, which introduces the requirement for handling of sulfuric acid.

It has now been identified that the sulfuric acid may be recycled to the Claus reaction furnace, where it may contribute to the formation of elemental sulfur, and in addition provide opportunities for optimization of the Claus and Claus tail gas process size and operational cost.

In WO 2012/152919 A1, a sulfuric acid process for treatment of Claus tail gas is presented in which the conversion of $H_2S$ to $H_2SO_4$ in a Claus tail gas is described. The steps in the process are:
1. Sub-stoichiometric oxidation
2. Claus conversion
3. Oxidation of reduced sulfur species ($H_2S$) in the Claus tail gas in oxygen rich atmosphere at 400-700° C.
4. Catalytic oxidation of $SO_2$ to $SO_3$
5. Condensation of $H_2SO_4$ It is recognized that the $H_2SO_4$ product is not always desirable and it is suggested to recycle the sulfuric acid to an upstream Claus reaction furnace or the $H_2S$ oxidation step as described above. However, the recycling of sulfuric acid is merely thought as an abatement of sulfuric acid, and the consequences of recycling the $H_2SO_4$ on the wet sulfuric acid or Claus process have not been evaluated, i.e. it is not recognized that $H_2SO_4$ recirculation requires a reduction in the amount of $O_2$ directed to the Claus reaction furnace, nor are the beneficial effects on the Claus and sulfuric acid process realized.

In WO 2012/152919 A1 it is also recognized that support fuel may be required in both the Claus reaction furnace and $H_2S$ oxidation step to obtain the desired operating temperature, without realizing the beneficial effects of using feedstock gases as support fuel for the $H_2S$ oxidation in the sulfuric acid process.

The proposal to recycle $H_2SO_4$ to the Claus reaction furnace will therefore in itself not provide a working process, but require additional process modifications.

According to the present invention a process for conversion of $H_2S$ to elemental sulfur with increased efficiency is presented, in which a Claus process is combined with a sulfuric acid process. According to this process, sulfuric acid produced in the sulfuric acid process, treating the Claus tail gas, is recycled to a sulfuric acid evaporation zone in or after the Claus reaction furnace for decomposition and elemental sulfur production.

For the purpose of the present application, a stoichiometric amount of oxygen shall be defined under the assumption that the products derived from N, H, C, S and O in the feed gas are $N_2$, $H_2O$, $CO_2$ and $SO_2$. If less than a stoichiometric amount of oxygen is present (also called sub-stoichiometric), this mean that not all feed components are fully oxidized. For a Claus gas feed, this means that the process gas after sub-stoichiometric combustion/reaction may contain unconverted $H_2S$, $NH_3$ and hydrocarbons from the feed stream(s) and $H_2$, CO, COS and $CS_2$ formed in the $O_2$ deficit environment.

For the purpose of the present application, a fuel shall be defined as a composition which, when oxidized with $O_2$ will form $N_2$, $H_2O$, $CO_2$ and $SO_2$ as the reaction product and release a substantial amount of energy by the reactions. A mixture of hydrocarbons (e.g. natural gas, with $CH_4$ and $C_2H_6$) as well as $H_2S$ is a typical fuel gas, but the fuel gas could also comprise CO, $NH_3$ and $H_2$.

For the purpose of the present application, oxygen ($O_2$) is understood as a stream containing $O_2$, such as air, enriched air and pure oxygen, but could also be a process gas containing $O_2$.

For the purpose of the present application, a sulfuric acid section is understood a facility for converting a process gas comprising sulfur (such as $H_2S$, $SO_2$, COS, $CS_2$ and elemental sulfur) to sulfuric acid. A sulfuric acid section may be implemented as a catalytic or thermal section oxidizing sulfur species to $SO_2$, followed by a section oxidizing $SO_2$ to $SO_3$, followed by either a condenser providing sulfuric acid by condensing hydrated $SO_3$, or an absorber providing sulfuric acid by absorbing $SO_3$ in sulfuric acid, but other means for production of sulfuric acid such as $H_2O_2$ scrubbers are also known to the skilled person.

For the purpose of the present application, a means for sulfur oxidation shall be understood as any process equipment receiving reduced or elemental sulfur, converting it into $SO_2$. Such means for sulfur oxidation may be a combustor, catalytic equipment or combinations thereof.

For the purpose of the present application the Claus reaction furnace may be described as comprising two zones; a reaction furnace zone and a sulfuric acid evaporation zone. The names of these zones are merely designations of the individual zones and not exclusive description of the chemical reaction occurring therein. The two zones shall be understood as non-overlapping, with the sulfuric acid evaporation zone being downstream the reaction furnace zone.

The sulfuric acid evaporation zone may either be a separate chamber, or it may be a part of a single chamber of the Claus reaction furnace, defined as the volume downstream the most upstream injection of sulfuric acid, and ending at the Claus reaction furnace outlet, typically by the tube sheet of the waste heat boiler. This volume may be further defined as the volume of the Claus reaction furnace downstream the plane defined by the most upstream injection of sulfuric acid and being orthogonal to the axis defined by the flow of product from the Claus reaction furnace flame.

For the purpose of the present application pressures indicated in the unit mbarg shall be understood to be gauge pressures relative to atmospheric pressure.

In a broad aspect the present invention relates to a process for production of elemental sulfur from a feedstock gas comprising from 15%, 20%, 30 vol %, 40 vol % or 50% to 99 vol % or 100 vol % $H_2S$ and a stream of sulfuric acid involving the steps of
  a. providing a Claus reaction furnace feed stream comprising an amount of said feedstock gas, an amount of oxygen and optionally an amount of fuel, wherein the amount of oxygen is substoichiometric with respect to the Claus reaction,
  b. directing said Claus reaction furnace feed stream to a reaction furnace zone operating at elevated temperature such as above 900° C., providing a reaction furnace zone product,
  c. directing said reaction furnace zone product and an amount of sulfuric acid to a sulfuric acid evaporation zone downstream said reaction furnace zone providing a Claus converter feed gas
  d. cooling said Claus converter feed gas to provide a cooled Claus converter feed gas and optionally withdrawing elemental sulfur from the gas
  e. directing said cooled Claus converter feed gas to contact a material catalytically active in the Claus reaction,
  f. withdrawing a Claus tail gas and elemental sulfur, optionally by cooling the effluent from said material catalytically active in the Claus reaction,
  g. directing a stream comprising said Claus tail gas to a Claus tail gas treatment plant,
with the associated benefit of a process involving injection of sulfuric acid in a sulfuric acid evaporation zone allowing high temperature combustion of said feedstock gas, including impurities, without cooling from evaporation and decomposition of sulfuric acid.

In a further embodiment the temperature in the reaction furnace zone outlet is more than 50° C. or 100° C. and less than 200° C. or 500° C., higher than the temperature at the outlet of said sulfuric acid evaporation zone, with the associated benefit of providing energy efficient cooling with less need for heat exchange equipment. Especially if an amount of said feedstock gas is by-passed to be reacted in the sulfuric acid evaporation zone, this difference in temperature may be low.

In a further embodiment the feedstock gas is split in a reaction furnace zone feedstock directed to the reaction furnace zone and a sulfuric acid evaporation zone feedstock directed to the sulfuric acid evaporation zone, with the associated benefit of enabling independent temperature control of the reaction furnace zone and the sulfuric acid evaporation zone. Such temperature control may be manual, possibly with the aid of proper presentation of process parameters, but it may also be automatic, based on process measurements.

In a further embodiment the ratio between said reaction furnace zone feedstock and the sulfuric acid evaporation zone feedstock is controlled to maximize the thermal destruction of impurities present in the reaction furnace zone, usually by maximizing the temperature in the reaction furnace zone.

In a further embodiment the average process gas residence time in the Claus reaction furnace is less than 5 seconds or less than 2 seconds, with the associated benefit of such a reaction furnace having an appropriate size, while allowing sufficient time for evaporation of sulfuric acid as well as the required partial chemical conversion of $H_2S$ to $SO_2$.

In a further embodiment the reaction furnace zone and/or the sulfuric acid evaporation zone comprise a turbulence enhancer, with the associated benefit of narrowing the residence time distribution in the reaction furnace zone and sulfuric acid evaporation zone.

In a further embodiment the sulfuric acid evaporation zone comprises a means of impaction, such as an impaction wall or a chamber packed with inert material, with the associated benefit of destroying droplets by collision, to ensure absence of liquid $H_2SO_4$ in the Claus converter feed gas.

In a further embodiment said Claus tail gas treatment involves the steps of
  directing a stream comprising said Claus tail gas, oxygen and a fuel as a feedstock gas to a Claus tail gas combustor operating at a temperature above 900° C. or a catalytic means for oxidation providing an $SO_2$ converter feed gas,
  h. directing said $SO_2$ converter feed gas to contact a material catalytically active in $SO_2$ oxidation to $SO_3$, providing an $SO_3$ rich gas,
  i. converting said $SO_3$ rich gas to concentrated sulfuric acid, either by absorption of $SO_3$ in sulfuric acid or by hydration of $SO_3$, cooling and condensation of sulfuric acid,
  j. recycling at least a part of the produced sulfuric acid to the sulfuric evaporation zone,
with the associated benefit of such a process having a high conversion and thermal efficiency and avoiding undesired formation of sulfuric acid. The use of a reaction furnace zone and a Claus tail gas combustor operating above 900° C. has the effect of ensuring complete conversion of the constituents present, and this may optionally require the presence of a fuel in addition to the feedstock gas. In addition, homogeneous Claus reactions will take place in the reaction furnace zone and sulfuric acid evaporation zone, such that elemental sulfur may be withdrawn when the Claus converter feed gas is cooled. The stream fed to the Claus tail gas combustor may typically include $H_2S$ as fuel from the Claus tail gas and/or a separate stream comprising $H_2S$, hydrocarbon or other fuels. In addition to the mentioned process steps the process may include further steps such as heat exchange for changing the temperature (or in other ways conditioning the process streams) to an appropriate range for the processes occurring.

In a further embodiment the reaction furnace zone feedstock gas comprises less than 0.1 vol % non-elemental nitrogen, such as $NH_3$, with the associated benefit of avoiding formation of e.g. ammonia salts which may plug the Claus condenser(s).

In a further embodiment the reaction furnace zone feed stream comprises less than 50%, 20%, 10% or 1% elemental nitrogen with the associated benefit of providing a process with a high temperature in the reaction furnace zone, and a reduced process gas volume, due to the reduced presence of $N_2$. This can be accomplished by using pure $O_2$ or oxygen enriched air as the oxygen source.

In an alternative process, steps d, e and f are carried out sequentially 2-5 times, with the associated benefit of enabling a higher conversion in the Claus process In a further embodiment the $H_2S$:$SO_2$ ratio of said Claus converter feed gas is below 4:1, 3:1 or 2:1, with the associated benefit of such a feed gas providing a $H_2S$ containing Claus tail gas to the Claus tail gas combustor, minimizing the need for fuel gas addition as the $H_2S$ oxidation releases a substantial amount of energy, whereas $SO_2$ does not release energy in the Claus tail gas combustor.

In a further embodiment, the $H_2S:SO_2$ ratio of said Claus converter gas is below 1.6:1, 1.8:1 or 2:1, with the associated benefit of having a substantially $H_2S$ free Claus tail gas. In the downstream sulfuric acid plant this can be an advantage as the $SO_2$ will not oxidize without a $SO_2$ conversion catalyst and thus it will be possible to preheat the Claus tail gas with a combination of catalytic $H_2S$ oxidation (controlled bypass of feedstock gas containing $H_2S$) and process gas recycle around the catalytic $H_2S$ oxidation, such that the temperature increase across the $H_2S$ oxidation catalyst can be closely controlled. With unknown and/or varying $H_2S$ concentration in the Claus tail gas, the risk of overheating the $H_2S$ oxidation catalyst is high.

In a further embodiment the process further comprises the step of directing an amount of a further feedstock gas to said Claus tail gas combustor, with the associated benefit of providing additional sulfur and fuel to the sulfuric acid process. The further feedstock gas may comprise impurities, which may be incinerated prior to the treatment in the sulfuric acid process, and/or hydrogen sulfide and other fuels which may contribute to the sulfuric acid production and the combustion in the Claus tail gas combustor. If the further feedstock gas comprises a high amount of inert gases or sulfur free fuels, the process also has the benefit of avoiding an increase in Claus converter size due to a non-contributing flow. The further feedstock gas may originate from the same source as the feedstock gas or it may originate from a different source.

In a further embodiment said further feedstock gas comprises more than 5 vol % non-elemental nitrogen, such as ammonia, with the associated benefit of enabling a process where the non-elemental nitrogen constituents, which may be difficult to oxidize in the sub-stoichiometric atmosphere of the reaction furnace zone, can be directed to the Claus tail gas combustor. Such a process may be especially beneficial if the further feedstock gas is a sour water stripper (SWS) gas comprising $H_2S$, $NH_3$ and $H_2O$—of which only $H_2S$ is desired in the Claus process, and $NH_3$ is problematic in the Claus process due to potential plugging by ammonia salt. Instead such an SWS gas may be directed to the sulfuric acid plant, where it is well known to handle $NH_3$.

In a further embodiment the amount of sulfur in the further feedstock gas is at least 1%, 2% or 5% of the total amount of elemental sulfur withdrawn from the process, with the associated benefit of such a feedstock gas being able to provide thermal energy while also contributing to the sulfur abatement.

In a further embodiment the material catalytically active in the Claus reaction comprises activated aluminum(III) oxide or titanium(IV) oxide with the associated benefit of such a material providing an efficient process for production of elemental sulfur.

In a further embodiment step (d) is carried out under a pressure of 200 mbarg to 700 mbarg, a temperature of 200° C. to 350° C. and a space velocity of 800 $Nm^3/h/m^3$ to 3000 $Nm^3/h/m^3$, with the associated benefit of such conditions being efficient for the production of elemental sulfur.

In a further embodiment step (d) is carried out at a temperature of 100° C. to 150° C. and step (e) involves the step of periodically heating said material catalytically active in the Claus reaction to allow withdrawal of condensed elemental sulfur in a liquid or gas phase, with the associated benefit of the low temperature being beneficial for achieving very high conversion of $SO_2$ and $H_2S$ into elemental sulfur, both due to a favorable equilibrium at the low temperature and due to a shifting of equilibrium by removing the reaction product.

In a further embodiment said material catalytically active in conversion of $SO_2$ to $SO_3$ comprises vanadium, with the associated benefit of such a material providing an efficient process for production of sulfuric acid.

In a further embodiment said step (i) is carried out under a pressure of 50 mbarg to 200 mbarg, a temperature of 380° C. to 520° C. and a space velocity of 800 $Nm^3/h/m^3$ to 1500 $Nm^3/h/m^3$, per catalyst bed, with the associated benefit of such conditions being efficient for the oxidation of $SO_2$ to form $SO_3$.

In a further embodiment the amount of sulfur in the recycled stream of sulfuric acid is higher than 1%, 3% or 5% and less than 17%, 21% or 25% of the total amount of elemental sulfur withdrawn from the process. A recycle above the lower limits has the benefit of providing the effect of reduced process gas volume, while the recycle being less than the upper limits avoids a situation where additional fuel must be added to the reaction furnace zone, resulting in extra process volume and operational cost.

In a further embodiment the concentration of said sulfuric acid is at least 80 w/w % or 90 w/w %, with the associated benefit of such acid providing an addition of oxygen to the Claus process, while minimizing the amount of water which must be evaporated in the sulfuric acid evaporation zone.

In a further embodiment the sulfuric acid in the recycled stream of sulfuric acid is atomized in said sulfuric acid evaporation zone using compressed air or pressure nozzles and wherein the residence time in the sulfuric acid evaporation zone is at least 0.5 seconds, 1 second or 1.5 seconds, with the associated benefit of such residence times being sufficient for complete evaporation of the sulfuric acid droplets.

In a further embodiment the molar ratio $H_2S:O_2$ of the components directed to the reaction furnace zone is at least 2.5, with the associated benefit of such a low oxygen feed enabling sub-stoichiometric partial conversion of $H_2S$ to $SO_2$, from the contribution from thermal dissociation of $H_2SO_4$, adding the remaining $O_2$ to obtain the desired $H_2S:SO_2$ ratio of 2.0 in the Claus tail gas.

In a further embodiment an amount of said sulfuric acid is from a source other than a Claus tail gas treatment plant, with the associated benefit of providing additional conversion of sulfuric acid to elemental sulfur.

In a further embodiment an amount of SWS gas comprising 20-50% $NH_3$, 20-50% $H_2S$ and at least 80% of the balance being $H_2O$, is directed as an additional feedstock to one or both of said reaction furnace zone and said Claus tail gas treatment.

In a further embodiment an amount of gas in the process is cooled and directed to an upstream position for controlling the process temperature, with the associated benefit of enabling active control of the temperature of the highly exothermic processes.

In a further embodiment one or more streams directed to said Claus reaction furnace are pre-heated by heat exchange with a hot process stream, with the associated benefit of minimizing or avoiding the requirements for support fuel to achieve the desired temperature for evaporation of sulfuric acid and conversion of the feedstock.

In a further embodiment one or more streams directed to said Claus tail gas combustor are pre-heated by heat exchange with a hot process stream with the associated benefit of minimizing or avoiding the requirements for support fuel to achieve the desired temperature for combustion and subsequent oxidation of $SO_2$.

In a further embodiment at least one of said catalytically active materials for oxidation of $SO_2$ to $SO_3$ or $H_2S$ to elemental sulfur and/or at least one product withdrawn from one of said catalytically active materials are cooled by heat exchange, such as interbed heat exchange or an internally cooled catalytic reactor, with the associated benefit of enabling active control of the temperature of the highly exothermic processes by interbed heat exchange or an internally cooled catalytic reactor such as a boiling water reactor, having a tubular or a thermoplate cooling circuit.

A further aspect of the present invention relates to a process plant comprising a reaction furnace zone, a sulfuric acid evaporation zone, a Claus waste heat boiler, a Claus conversion section, a means for sulfur oxidation and a sulfuric acid section, wherein the reaction furnace zone has an inlet and an outlet, the sulfuric acid evaporation zone has a gas inlet, a sulfuric acid inlet and an outlet, the Claus waste heat boiler has a gas inlet, a gas outlet and an elemental sulfur outlet, the Claus conversion section has a gas inlet, a gas outlet and an elemental sulfur outlet, the means for sulfur oxidation has an inlet and an outlet and the sulfuric acid section has a gas inlet, a gas outlet and a sulfuric acid outlet, and wherein the inlet of the reaction furnace zone is configured for receiving a feedstock gas and an oxidant, wherein the outlet of the reaction furnace zone is configured for being in fluid communication with the gas inlet of the sulfuric acid evaporation zone, the sulfuric acid inlet of the sulfuric acid evaporation zone is configured for receiving a stream of sulfuric acid and the outlet of the sulfuric acid evaporation zone is configured for being in fluid communication with the inlet of the Claus waste heat boiler, wherein the outlet the Claus waste heat boiler is configured for being in fluid communication with the inlet of the Claus conversion section and wherein the inlet of the means for sulfur oxidation is configured for being in fluid connection with the outlet of said Claus conversion section gas outlet, the means for sulfur oxidation outlet is configured for being in fluid connection with the inlet of the sulfuric acid section characterized in the sulfuric acid outlet of the sulfuric acid section in fluid connection with the sulfuric acid inlet of said sulfuric acid evaporation zone, with the associated benefit of a process involving injection of sulfuric acid in a separate sulfuric acid evaporation zone allowing high temperature combustion of said feedstock gas, including impurities, without cooling from evaporation and decomposition of sulfuric acid.

In a further embodiment the reaction furnace zone and the sulfuric acid evaporation zone are two separate mechanical units, with the associated benefit of providing independent optimization and positioning of the two zones.

In a further embodiment the reaction furnace zone and the sulfuric acid evaporation zone is a single physical unit, with the associated benefit of a reduced cost.

The present invention describes a combination of a Claus and sulfuric acid process, which effectively can produce the amount of sulfuric acid required by a process plant or even avoid production of sulfuric acid and convert excess sulfuric acid to elemental sulfur which may be transported to other sites.

For maximum conversion to elemental sulfur ⅓ of the $H_2S$ must be converted to $SO_2$.

  (1)

The stoichiometric ratio between $H_2S$ and $SO_2$ is controlled by controlling the amount of oxygen in the reaction furnace zone. Oxygen is typically supplied by atmospheric air, but can also be $O_2$ enriched air or even pure $O_2$.

The oxygen addition to the reaction furnace zone must also take into account the amounts of $NH_3$, CO, $H_2$ and hydrocarbons in the feed streams.

If the combustion temperature in the reaction furnace zone is less than 1100° C. the conversion of e.g. $NH_3$ may be incomplete. The consequence of this will be a Claus converter feed gas having a potential for formation of ammonia salts, such as $(NH_4)_2SO_4$ and $(NH_4)_2SO_2O_3$ which may plug the Claus condenser.

The partially oxidized Claus converter feed gas is then converted to elemental sulfur by the following reactions at a temperature typically above 200° C. in the presence of a catalytically active material, such as activated aluminum(III) oxide or titanium(IV) oxide.

  (2)

Often 3-4 Claus converters are operated in series, to increase the conversion to a maximum, which will increase the cost of a Claus plant.

The control of temperature in the Claus process is important to ensure that elemental sulfur formed in catalytic converter remains gaseous until the desired process position for condensation. A further restriction is related to the fact that as the Claus process is exothermic it is beneficial to operate at low temperatures.

An alternative to the above process is the so-called sub-dewpoint Claus process, in which the material catalytically active operates at temperatures where elemental sulfur is not on the gas phase. Such a sub-dewpoint Claus process will require an appropriate scheme for withdrawal of condensed elemental sulfur, e.g. by pulsing of the temperature and purging of elemental sulfur by an inert gas.

Even with 3-4 Claus converters/condensers/reheaters in series it is not possible to reach more than ~98% sulfur recovery, which is insufficient to comply with most environmental legislations. Therefore, the Claus plant is typically equipped with a so-called Claus tail gas solution, where the above mentioned sub-dewpoint process is an example. Numerous tail gas processes exist, having different features. To achieve very high removal efficiencies these Claus tail gas plants become complicated and approach the same cost as the Claus plant itself.

The produced elemental sulfur, does typically not have a direct use in the plants producing the $H_2S$ containing waste stream, but elemental sulfur is simple to transport to other sites and to store for prolonged periods.

A common alternative to the Claus process is the conversion of $H_2S$ to sulfuric acid, e.g. by the so-called wet sulfuric acid process. The sulfuric acid produced may be used in other chemical processes in the plant. A wet sulfuric acid process may also constitute the tail gas cleaning of a Claus process plant. A similar dry sulfuric acid process may also find use in this relation.

The sulfuric acid processes oxidize $H_2S$ to $SO_2$ and the $SO_2$ into $SO_3$ and subsequently hydrate $SO_3$ into sulfuric acid, either by reaction with water in the gas phase in the so-called wet sulfuric acid process or by absorption in concentrated sulfuric acid in the so-called contact process or dry process. The reaction temperature during oxidation of $SO_2$ to $SO_3$ will be in the range 400-500° C., in the presence of a catalytically active material, typically comprising vanadium. Typically, the wet sulfuric acid processes produce sulfuric acid having a concentration in the range 92%-98%, whereas dry sulfuric acid processes may also produce sulfuric acid having a concentration in excess of 98%.

In addition, it may also be attractive to collect high pressure steam in the range from 30 barg to 80 barg from the highly exothermic sulfuric acid processes, whereas the Claus process will only provide steam of lower pressure and in significantly lower amounts.

Production of large amounts of sulfuric acid may, however, be less attractive, even though sulfuric acid is traded commercially, as transport of sulfuric acid is complex and regulated.

The reactions taking place in a sulfuric acid process (dry and wet) are $$H_2S + 1.5O_2 \rightarrow SO_2 + H_2O \quad (3)$$

$$SO_2 + 0.5O_2 \rightarrow SO_3 \quad (4)$$

$$SO_3 + H_2O \rightarrow H_2SO_4 \quad (5)$$

The overall reaction of the sulfuric acid process can be described according to $$H_2S + 2O_2 \rightarrow H_2SO_4 \quad (6)$$

The wet sulfuric acid process as an ordinary Claus tail gas solution provides a solution that fulfills the environmental regulations at both lower capital and operating cost than the alternatives. The only disadvantage of the wet sulfuric acid process, so far, has been the sulfuric acid product that is not always desirable.

It has now been realized that the integration of the Claus process and sulfuric acid process may also be carried out by recycle of all or substantially all produced sulfuric acid to the sulfuric acid evaporation zone. With the new invention, an integrated Claus/wet sulfuric acid process will remove the disadvantage of an inconvenient sulfuric acid product, and at the same time reduce plant size of both the Claus and wet sulfuric acid process.

Combustion of sulfuric acid is known from regeneration of spent sulfuric acid in a wet sulfuric acid plant, but has not been practiced in the reaction furnace of the Claus process or under Claus process conditions.

When the sulfuric acid is injected into the sulfuric acid evaporation zone the following overall reaction takes place $$H_2SO_4 + 3H_2S \rightarrow 2S_2 + 4H_2O \quad (7)$$

To complete this overall reaction, the following reactions have to be completed:

$$H_2SO_4 \text{ (liquid)} \rightarrow H_2SO_4 \text{ (gas)} \quad (8)$$

$$H_2SO_4 \text{ (gas)} \rightarrow H_2O \text{ (gas)} + SO_3 \text{ (gas)} \quad (9)$$

$$SO_3 \text{ (gas)} \rightarrow SO_2 \text{ (gas)} + 0.5O_2 \text{ (gas)} \quad (10)$$

Reaction (8) is a common evaporation reaction, in which energy required for heating up the liquid and evaporating water and sulfuric acid is supplied by the hot surrounding process gas. An effect of full evaporation of sulfuric acid is that gaseous $H_2SO_4$ is far less corrosive than liquid $H_2SO_4$ droplets.

Reaction (9) is an endothermal dissociation reaction, which occurs almost instantaneously at temperatures above 600° C. At this point some $SO_3$ will start reacting with $H_2S$ to form $SO_2$, $H_2O$ and elemental sulfur.

Reaction (10) is an endothermal decomposition reaction, which is rapid at temperatures above 900° C. In oxygen rich atmospheres, chemical equilibrium prevents complete dissociation, but in reducing atmospheres, the removal of the $O_2$ product (by reaction with $H_2S$) will allow for complete decomposition. The reaction between $H_2S$ and $O_2$ is very fast at these elevated temperatures.

As the residence time in a sulfuric acid evaporation zone is typically 1-2 seconds, it must be assured that the reactions 8, 9, 10 and 1 are completed within this time. When the process gas is cooled, i.e. in the Claus waste heat boiler, the reaction rates dramatically decrease and further conversion will be insignificant.

Presence of $O_2$ and/or $SO_3$ in the process gas contacting the catalyst in the downstream Claus reactors will lead to deactivation of the catalyst due to "sulfation" reaction, where catalytically active aluminum oxide or titanium oxide is converted into catalytically inactive aluminum sulfate or titanium sulfate and thus elemental sulfur formation in these reactors will decrease, leading to an increase in unconverted sulfur species to the downstream tail gas sulfuric acid plant and increased emissions to the atmosphere.

Furthermore, $SO_3$ in the process gas can, during passage through the sulfur condensation units, combine with water and condense and form sulfuric acid in the elemental sulfur product, which can lead to corrosion of process equipment.

To eliminate the risk of any unconverted $SO_3$ from the sulfuric acid evaporation zone causing operational problems in the Claus converters and elemental sulfur condensers, a catalytic reactor can preferably be installed between the outlet of the waste heat boiler and the first elemental sulfur condenser or first catalytic Claus reactor. The catalyst is effective in reducing the content of $SO_3$ to harmless $SO_2$ and/or elemental sulfur by the $H_2S$ and $H_2$ present in the reaction furnace off gas.

If all sulfuric acid produced in the Claus tail gas sulfuric acid process is directed to the sulfuric acid evaporation zone, it is possible to operate a Claus process in which the $H_2S$ abatement employs the very high removal efficiency as well as thermal efficiency of the sulfuric acid plant, but in which the only product is elemental sulfur, which is simple to handle and transport.

In addition, by the recycle of sulfuric acid, $O_2$ is released by the decomposition of $H_2SO_4$, such that the amount of added combustion oxidant will be reduced, which, if the oxidant is atmospheric air, has the benefit of reducing the process volume dramatically, since atmospheric air comprises close to 80% inert $N_2$, i.e. 4 volumes of $N_2$ per volume of $O_2$.

The overall Claus reaction, based on air as $O_2$ carrier to the Claus reaction furnace is:

$$4H_2S + 2O_2 + 8N_2 \rightarrow 2S_2 + 4H_2O + 8N_2 \quad (11)$$

Similarly, the overall Claus reaction, based on $H_2SO_4$ as the $O_2$ carrier to the Claus reaction furnace is:

$$3H_2S + H_2SO_4 \rightarrow 2S_2 + 4H_2O \quad (12)$$

Comparing the two reactions, it is evident that $H_2SO_4$ is an excellent $O_2$ carrier and has the (theoretical) potential to reduce the Claus tail gas volume flow by 67% compared to atmospheric air.

It may also be beneficial to by-pass an amount of feedstock gas to the Claus tail gas combustor, since the feedstock gas has a calorific value, which may be used in the Claus tail gas combustor, and thus reduce the requirement for addition of support fuel. This may be even more beneficial if two sources of feedstock gas exist, such that one feedstock gas free of $NH_3$ and another feedstock gas containing $NH_3$, since the substoichiometric conditions in the reaction furnace zone impedes complete oxidation of $NH_3$. So-called Sour Water Stripper (SWS) gases is an example of such an $NH_3$ containing feed stock gas.

In Claus processes for treatment of SWS gas, the complete destruction of $NH_3$ in the reaction furnace zone is crucial, otherwise ammonia salts such as $(NH_4)_2SO_4$ and $(NH_4)_2S_2O_3$ will form and plug the final elemental sulfur condenser. Special high intensity (two-stage) burners are able to reach the high temperatures needed for thermal $NH_3$ destruction, but require accurate control of sour gas in two separate streams.

However, it is well known to treat SWS gas in a sulfuric acid plant, since complete oxidation of $NH_3$ to $N_2$ and NO is obtained with excess oxygen at temperature around 1000° C. Therefore, it may be desirable to configure an integrated Claus/sulfuric acid process with two combustors for directing a first feedstock comprising $H_2S$ and little or no $NH_3$ to the reaction furnace zone while directing a gas comprising $NH_3$, such as SWS gas, to the Claus tail gas combustor. In such a configuration it may be desirable to design the sulfuric acid plant to include a section for selective catalytic reduction (SCR) of $NO_x$ by $NH_3$ in the presence of a vanadium based catalyst.

When designing a Claus burner and reaction furnace, the destruction of hydrocarbons (e.g. $CH_4$ and BTX) and, if present, $NH_3$ typically determines the operating temperature and residence time. Breakthrough of these species to the catalytic Claus section could result in catalyst fouling and deactivation and plugging of elemental sulfur condensers, leading to unplanned shutdowns.

The reactions considering $H_2S$ (reaction 1 and 2) are generally considered fast and will not be rate determining reactions.

As a rule of thumb, a temperature of 1000-1050° C. is required for complete destruction of hydrocarbons, taking into account the effects of slow mixing and temperature/composition gradients. Similarly, 1200-1250° C. is required to ensure proper destruction of $NH_3$ in the reaction furnace.

To reach such high temperatures, especially in the case with feed gases with low caloric value a selection of feed gas preheating, oxygen enrichment, sour gas staging and/or fuel gas co-firing may be required.

With the introduction of sulfuric acid, proper design and operation of the Claus burner and reaction furnace will become more important as the overall effect of injecting sulfuric acid into the Claus reaction furnace is a decrease in temperature, the exact value depends on the feed gas caloric values and the relative amount of sulfuric acid directed to the reaction furnace. Considering around 5% of the total elemental sulfur production is supplied in the form of sulfuric acid, the overall temperature decrease in the Claus reaction furnace will typically be 50-100° C.

The simplest layout is to configure the Claus burner to accept all the feeds and adjust the temperature in the Claus reaction furnace by fuel gas addition and/or make use of e.g. feed gas preheating and $O_2$ enrichment.

However, this can in some cases significantly increase fuel gas consumption, combustion air flow and total process gas flow to an extent at which the Claus and Claus tail gas plants will become too large, resulting in an uncompetitive solution. Furthermore, the increased fuel consumption will increase the operating cost.

The disclosed invention describes a method for adding the sulfuric acid to the Claus reaction furnace in a way that both ensures the required high operating temperatures for destruction of hydrocarbons and $NH_3$ and reduces plant size and operating costs.

It has been realized that establishing a high temperature in a reaction furnace zone with lower $O_2$ stoichiometry than corresponding to the Claus reaction, and directing sulfuric acid into a downstream sulfuric acid evaporation zone, which cools the process gas by the endothermal reactions related to the evaporation, dehydration and dissociation of the sulfuric acid, will provide the necessary temperature for the destruction of hydrocarbon and $NH_3$ while retaining the benefits of the $O_2$ enrichment properties of the sulfuric acid. This is achieved by realizing that as long as the hydrocarbons and $NH_3$ are destroyed in the high temperature reaction furnace zone, the sulfuric acid evaporation zone comprising the sulfuric acid injection does not require the same high temperature as both the $H_2SO_4$ related reactions (7-10) and the direct $H_2S$ related reactions (1-2) will take place at these lower temperatures. A lower temperature will result in a lower equilibrium conversion of $H_2S$ and $SO_2$ into elemental sulfur, however the downstream catalytic converters can compensate for this slightly lower yield of elemental sulfur in the reaction furnace.

The $O_2$ enrichment and process gas cooling effects of sulfuric acid injection result in both a smaller process gas flow and lower process gas temperature to the waste heat boiler and thus it will be possible to use a smaller and cheaper waste heat boiler.

In one embodiment the Claus reaction furnace is configured such that the high temperature reaction furnace zone including the Claus burner receives the full amount of combustion air, the $NH_3$ containing feed gas and at least a fraction of the sour gas and the sulfuric acid evaporation zone is configured for receiving the full amount sulfuric acid and optionally a fraction of the sour gas. This will enable $NH_3$ destruction without fuel gas co-firing as the temperature reducing effect of the sulfuric acid injection is delayed until the $NH_3$ has been destroyed.

The reaction furnace zone operates under very fuel rich conditions, i.e. the $O_2$ input is lower than needed for the complete conversion of all combustibles into $CO_2$, $SO_2$ and $H_2O$. This is normal practice for a Claus reaction furnace as typically only around ⅓ of the required $O_2$ is supplied. However, with the sulfuric acid injection into the sulfuric acid evaporation zone, the reaction furnace zone operates with even lower $O_2$ input as a considerable amount of the $O_2$ is supplied via the $H_2SO_4$ and to lesser extent via the atomization media in the sulfuric acid evaporation zone. The heat generated in the reaction furnace zone is directly related to the $O_2$ input and the process gas temperature is directly related to the heat generated and the total amount of process gas in the reaction furnace zone. In order to increase the temperature in the reaction furnace zone, the total amount of process gas can be decreased by bypassing a fraction of the sour gas to the sulfuric acid evaporation zone. The amount of sour gas that can be bypassed depends on several factors, such as the heating values of the inlet streams, the extent of preheating of the feed streams, the required reaction furnace zone temperature, the occurrence of impurities in the sour gas and the sulfuric acid evaporation zone temperature.

In e.g. refineries, there will typically be a concentrated sour gas (>80 vol % $H_2S$) and a $NH_3$ and $H_2S$ containing gas (sour water stripper (SWS) gas), where the majority of the sulfur input is present in the sour gas. The reaction furnace zone may then be configured to accept the entire amount of SWS gas and combustion air and an amount of sour gas, such that the reaction furnace zone temperature will be around 1200-1250° C. and complete $NH_3$ destruction is achieved before the sulfuric acid evaporation zone, where the sulfuric acid, any atomization media and remaining sour gas is injected. By this setup, the temperature in the sulfuric acid evaporation zone will be of minor importance as the sour gas contains low concentrations of impurities (such as hydrocarbons) which otherwise would require a certain temperature for complete destruction.

In natural gas processing plants, the feed stock gas to the Claus plant will be less concentrated in $H_2S$ (typically <60 vol %) and will contain hydrocarbons, which require a temperature higher than 1000-1050° C. to ensure complete destruction of the hydrocarbons. In such situation, the preferred option would most likely be to direct the entire amount of sour gas into the reaction furnace zone.

Both the reaction furnace zone and sulfuric acid evaporation zone can have turbulence enhancers installed, such that efficient mixing of the process gas from the reaction furnace zone and the sulfuric acid an optionally a fraction of the sour gas is completed as fast as possible. The turbulence enhancers could e.g. be choke rings, vector walls, tangential inlets etc. which will provide a more narrow residence time distribution for the process gas, enhance mixing, increase evaporation of sulfuric acid droplets and reducing the likelihood of a droplet experiencing a much lower than average residence time.

The sulfuric acid evaporation zone can also be equipped with means of impaction, which can reduce the amount of large droplets, which, due to their high inertia, will not be able to follow the stream lines of the gas, which is diverted close to the obstructions in the means of impaction. Instead the large droplets will continue onwards and collide with the obstruction and evaporate from the obstruction surface. The result is a reduced risk of carryover of unreacted $SO_3$ to the process downstream the waste heat boiler of the Claus reaction furnace, thus avoiding condensation of sulfuric acid in the elemental sulfur condensers and/or deactivation by sulfation of the catalyst in the catalytic Claus converters. Such means of impaction could be checker walls, stumble walls, vector walls, labyrinth walls and compartments of (inert) packing material.

In another embodiment the feedstock gases to the Claus plant is a sour gas highly concentrated in $H_2S$ and a SWS gas comprising $NH_3$ and the Claus tail gas sulfuric acid plant is configured to receive the entire amount of SWS gas, thus saving fuel in the Claus tail gas combustor and eliminates operational issues in the Claus plant, related to incomplete destruction of the $NH_3$ in the Claus reaction furnace. The reaction furnace zone in the Claus plant is configured to receive the entire amount of combustion air, fuel gas (if necessary) and at least a fraction of the sour gas, while the sulfuric acid evaporation zone is configured for receiving at least a fraction the sulfuric acid from the Claus tail gas sulfuric acid plant and the remaining sour gas.

In another embodiment, the evaporation of the sulfuric acid takes place in a compartment separated from the reaction furnace zone and the sulfuric acid laden gas from that compartment is added to the process gas from the high temperature reaction furnace zone after the sulfuric acid evaporation has been completed. Such embodiment will provide a dedicated compartment for the sulfuric acid evaporation, allowing sufficient time for droplet evaporation prior to mixing with the major process gas flow. The advantage of this embodiment is that the dedicated chamber can be much smaller than the reaction furnace while having a much larger residence time for droplet evaporation, allowing a cost effective solution for the reaction furnace.

The energy required for the evaporation of the sulfuric acid can be supplied by withdrawing a fraction of the process gas from the reaction furnace zone and direct the sulfuric acid into this smaller gas volume. The advantage of such embodiment is that the energy is already available in the process gas and there is no dilution of the process gas in the Claus plant, from the combustion products if using a support fuel.

An alternative energy source is a fraction of the combustion air, which can be further preheated before the sulfuric acid is injected into this stream. The advantage of such solution is that the flow and temperature of the combustion air is easier controlled compared to bypassing a fraction of the process gas from the reaction furnace zone.

Another option is to combust fuel gas with air to provide a hot process gas in which the sulfuric acid can be injected. The advantage of that solution is that the reaction furnace zone is very little effected and for e.g. revamp solutions, the sulfuric acid evaporation chamber can be constructed while the existing Claus plant is in operation.

The integrated process according to the present disclosure may also benefit from the use of oxygen enriched air or substantially pure oxygen in the reaction furnace zone. The use of oxygen enriched air has the benefit of reducing the amount of inert nitrogen in the process gas, and thus reducing the process gas volume and thus reduce plant size. The absence of dilution by nitrogen also has the effect of increasing the combustion temperature, which may be beneficial if impurities are present which need complete conversion, especially since the amount of oxygen in the Claus reaction furnace is sub-stoichiometric. Since the Claus catalyst is sensitive to presence of impurities, such as light hydrocarbons it may often be beneficial to operate the Claus reaction furnace with oxygen enriched air to achieve an elevated temperature for complete oxidation of impurities. This also has the further benefit of enabling an initial homogeneous non-catalytic Claus conversion, which may take place at temperatures above 900° C.

From a thermal efficiency perspective, the high combustion temperature may however be limited by the choices of construction materials in the Claus reaction furnace and downstream waste heat boiler. For highly concentrated $H_2S$ feed gases, oxygen enrichment may increase the process gas temperature above the design temperatures for the materials. A combination of $H_2SO_4$ recycle (which cools the process gas by evaporation and acid decomposition) will however make use of enriched $O_2$ in such a layout possible.

The Claus tail gas combustor will typically be operated with atmospheric air, and in addition it may also be beneficial to direct gases with a low concentration of sulfur species to the Claus tail gas combustor as complete combustion of the sulfur species release considerably more energy than the partial oxidation taking place in the Claus reaction furnace.

As a consequence, it may be beneficial to direct feedstock gases comprising high concentrations of $H_2S$ to the Claus plant, while by-passing the less concentrated feedstock gases as well as feedstock gases comprising $NH_3$ to the Claus tail gas combustor.

If the Claus tail gas combustor only receives a Claus tail gas comprising only a limited amount of $H_2S$, the calorific value is too low to sustain a stable combustion. In that situation addition of a support fuel is required. This support fuel may either be $H_2S$, SWS gas or a hydrocarbon feed, but preferably an amount of an existing feedstock gas to the integrated Claus and sulfuric acid plant is used.

The integration between the Claus process and the sulfuric acid process allows for integration benefits. These include the possibility to reduce the volumetric flow in the Claus process, by providing oxidant in the form of sulfuric acid, which can replace atmospheric air. In addition, the use of feedstock gas may be optimized such that feedstock gases comprising fuels contributing highly to elemental sulfur production may be directed to the Claus process, whereas feedstock gases contributing with thermal energy and non-reacting products such as $CO_2$ may be directed to the sulfuric acid process. Where the process is designed for recycle of a too high amount of sulfuric acid, additional fuel may be required for providing the heat required for evaporation and dissociation of sulfuric acid.

In a preferred embodiment, the sulfuric acid produced in the Claus tail gas sulfuric acid plant is cooled and directed to an intermediate storage tank. In principle the sulfuric acid storage tank can be omitted as the Claus reaction furnace is designed to accept the entire sulfuric acid production from the sulfuric acid plant. However, in order to ensure high reliability of the overall plant, the installation of the tank allows for (short time) operation of the Claus plant without sulfuric acid injection while the sulfuric acid plant is still in operation. Such situations can arise during start-up and shut-down and if maintenance of the sulfuric acid lances/nozzles is required. The tank will also enable withdrawing sulfuric acid product, should this become a desired product and also allow import of sulfuric acid from other sources.

A tank capacity for 4 to 120 hours of sulfuric acid production is a good compromise between tank cost and Claus+Claus tail gas sulfuric acid plant flexibility.

In another embodiment, the sulfuric acid produced in the Claus tail gas sulfuric acid plant is further concentrated in an acid concentrator before recycled to the Claus reaction furnace. The operation of such a concentrating plant will require energy to evaporate water from the sulfuric acid, but much of this energy is then saved in the sulfuric acid evaporation zone. The benefit of this embodiment is a lower decrease in process gas temperature in the sulfuric acid evaporation zone and a decrease of process gas flow through the Claus plant and Claus tail gas plant.

In addition to the wet sulfuric acid process, sulfuric acid can also be produced in other sulfur abatement processes. A first example is the SNOX process in which selective catalytic reduction of $NO_x$ is integrated with the wet sulfuric acid process, this layout being especially favorable for flue gases with less than 1 vol % $SO_2$. Also relevant are $H_2O_2$ scrubbers, which are often favored for small waste gas volumes with low $SO_2$ concentrations, where $SO_2$ is directed to react with $H_2O_2$ directly forming $H_2SO_4$. In addition, dry sulfuric acid processes operating by absorption in sulfuric acid may be considered. Sulfuric acid is also produced in a process where the feed gas enters the reactor and travels up through an activated carbon bed in which the sulfur dioxide is converted to sulfuric acid by wet catalysis in the presence of oxygen and water. Sulfuric acid from all these and other sources may also be beneficial to direct to a Claus reaction furnace.

However, the benefit of the sulfuric acid injection into the Claus reaction furnace decreases as the sulfuric acid concentration decreases, as a consequence of the extra energy required for the evaporation of water and the increase in process gas flow caused by the increased amounts of water in the sulfuric acid feed. Sulfuric acid produced by reaction with $H_2O_2$ and activated carbon processes is typically too low to provide a beneficial integration with the Claus plant, but combined with an acid concentration process, such processes may be beneficial to integrate with the Claus process.

The integration of the two processes also enable a process where the operation of the Claus process is carried out with a low conversion such as 90% or 95%—since it may be cheaper to carry out the additional conversion in a sulfuric acid process compared to the addition of an extra Claus converter stage.

A standard Claus plant layout requires >50 vol % $H_2S$ in the feed gas to be thermally self-sustainable in the Claus reaction furnace. With lower $H_2S$ concentrations, feed gas preheating and so-called split flow configuration is required. Claus plants treating feed gases with <10-20 vol % $H_2S$ are rarely seen. Sulfuric acid processes, on the other hand, very efficiently treat these so-called lean $H_2S$ gases, producing concentrated sulfuric acid. The sulfuric acid product will be highly concentrated in sulfur and oxygen.

A combination of a sulfuric acid plant to treat a lean $H_2S$ (and/or other sulfur compounds) gas in combination with a Claus plant treating a rich $H_2S$ gas and accepting the acid from the sulfuric acid plant will be a beneficial setup as the feed streams to both the Claus plant and sulfuric acid plant are optimal with regard to conversion efficiency, thermal efficiency and plant size/cost.

The coupling between the Claus process and a sulfuric acid process may also be used to optimize the treating of feeds. Sulfuric acid processes and in particular the wet sulfuric acid process has the benefit of being well suited for contaminated feeds, including SWS gases comprising ammonia as discussed above, "dirty sulfur" comprising organic impurities and moderate amounts of inorganic impurities, dilute streams of $H_2S$, $SO_2$ and other sulfur compounds, including flue gases from burners and FCC gas. Similarly, rich $H_2S$ gases, which must be diluted before being treated in a wet sulfuric acid plant, may instead be directed immediately for the Claus process.

FIGURES

FIG. 1 shows a sequential Claus+sulfuric acid process with sulfuric acid recycled to the Claus plant with a single zone Claus reaction furnace.

FIG. 2 shows an integrated Claus+sulfuric acid process with addition of sulfuric acid in a sulfuric acid evaporation zone according to the present disclosure FIG. 3 shows a detail of an integrated Claus+sulfuric acid process; a Claus reaction furnace layout in which a sulfuric acid evaporation zone is separated from the reaction furnace zone as two separate chambers and hot process gas is used as energy source for sulfuric acid evaporation.

Figure 1:
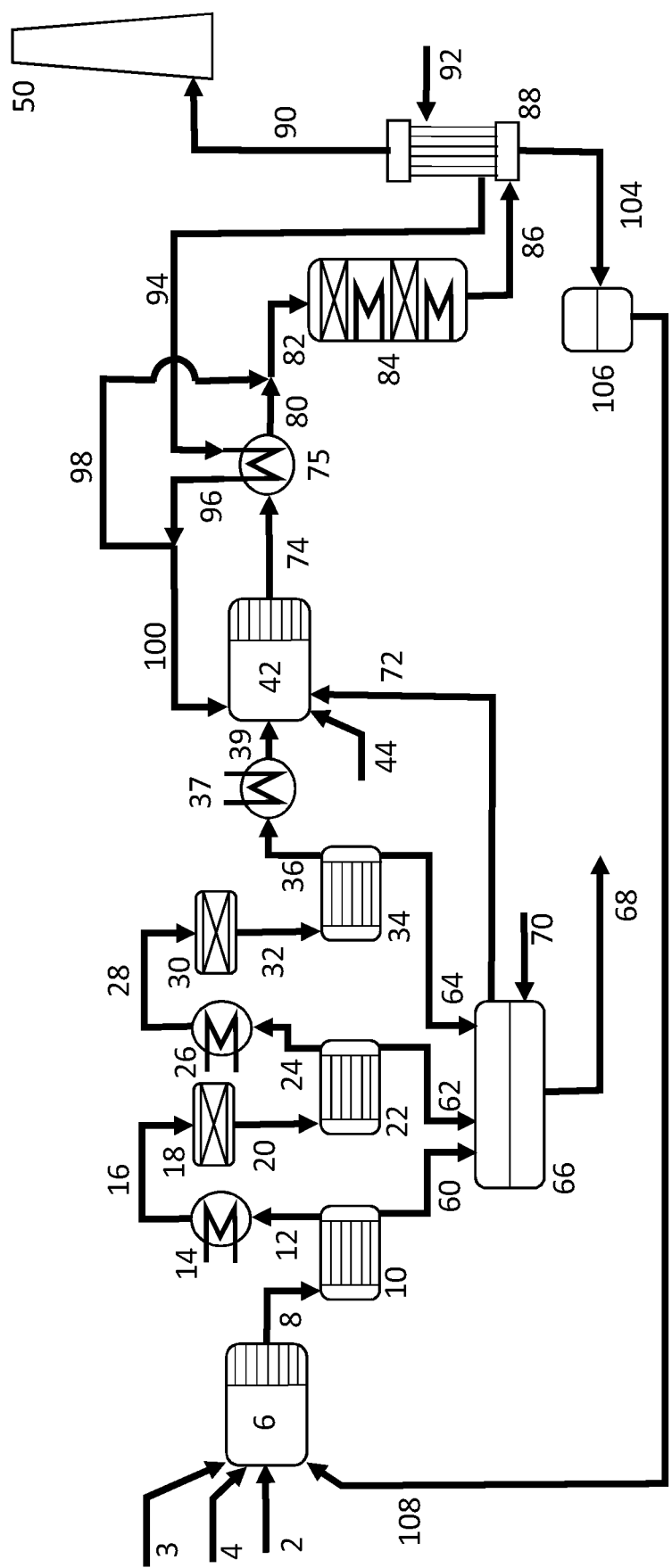

In FIG. 1 a Claus burner and reaction furnace 6 is configured for receiving a sour gas (3), an optional fuel gas (4), combustion air (2) and sulfuric acid (108). At the backend of the reaction furnace 6 a waste heat boiler is located, cooling the Claus reaction furnace off gas, which via line 8 enters the first elemental sulfur condenser 10, where elemental sulfur is condensed and withdrawn via line 60 while substantially elemental sulfur free process gas exits via line 12 to be reheated in heat exchanger 14, which also could be an in-line burner. The reheated process gas 16 enters first catalytic Claus reactor 18 in which additional elemental sulfur is formed. The converted process gas 20 then passes through second elemental sulfur condenser 22, where liquid elemental sulfur is withdrawn via line 62 and substantially sulfur free process gas exits via line 24. Typically, the process gas passes through 1-2 other reheat (26), conversion (30) and condensation (34) step(s) before leaving the Claus plant as Claus tail gas via line 36 and enters the Claus tail gas treatment plant.

The elemental sulfur lines 60, 62 and 64 are combined into a common sulfur pit 66. The sulfur pit is flushed with air 70 to release and remove vapors and the sulfur pit vent gas 72 can be directed to either the Claus burner 6 or the tail gas combustor 42. The degassed elemental sulfur product exits the Claus plant via line 68.

The Claus tail gas 36 is optionally heated in heat exchanger 37 and enters via line 39 the burner in the tail gas combustor 42. Additional fuel is supplied via line 44 and heated combustion air is added via line 100. The so-called pit vent gas from the sulfur pit 72 can advantageously be added to the combustor too. In the backend of the Claus tail gas combustor 42, a waste heat boiler is located, cooling the combustor off gas. The cooled combustor off gas 74 can optionally be further cooled in an air heater 75 and the further cooled combustor off gas 80 can be mixed with a stream of hot dilution air 98. The mixed process gas 82 then enters the $SO_2$ converter 84, which consists of a number of catalyst beds for $SO_2$ to $SO_3$ oxidation and heat exchangers installed between the catalyst beds. Typically, 1-3 catalyst beds are installed. The converted off gas 86 is led to a condenser 88, in which concentrated sulfuric acid is withdrawn via the bottom outlet 104, optionally cooled (not shown) and pumped to an optional intermediate storage tank 106. From the tank, the sulfuric acid is directed to the Claus burner and reaction furnace 6 via line 108. The substantially sulfuric acid free off gas 90 is directed to the stack 50 or another plant for further reduction of $SO_2$ and/or sulfuric acid mist (not shown).

The sulfuric acid condenser 88 use air 92 as cooling media and the hot air leaves the condenser via line 94 and a part of this air can be further heated in air heater 75. The further heated air 96 can then be directed to the Claus tail gas combustor (42) as combustion air via line 100 and via line 98 added to the process gas 80 to provide sufficient oxygen for the $SO_2$ to $SO_3$ oxidation reaction in $SO_2$ converter 84.

Figure 2:
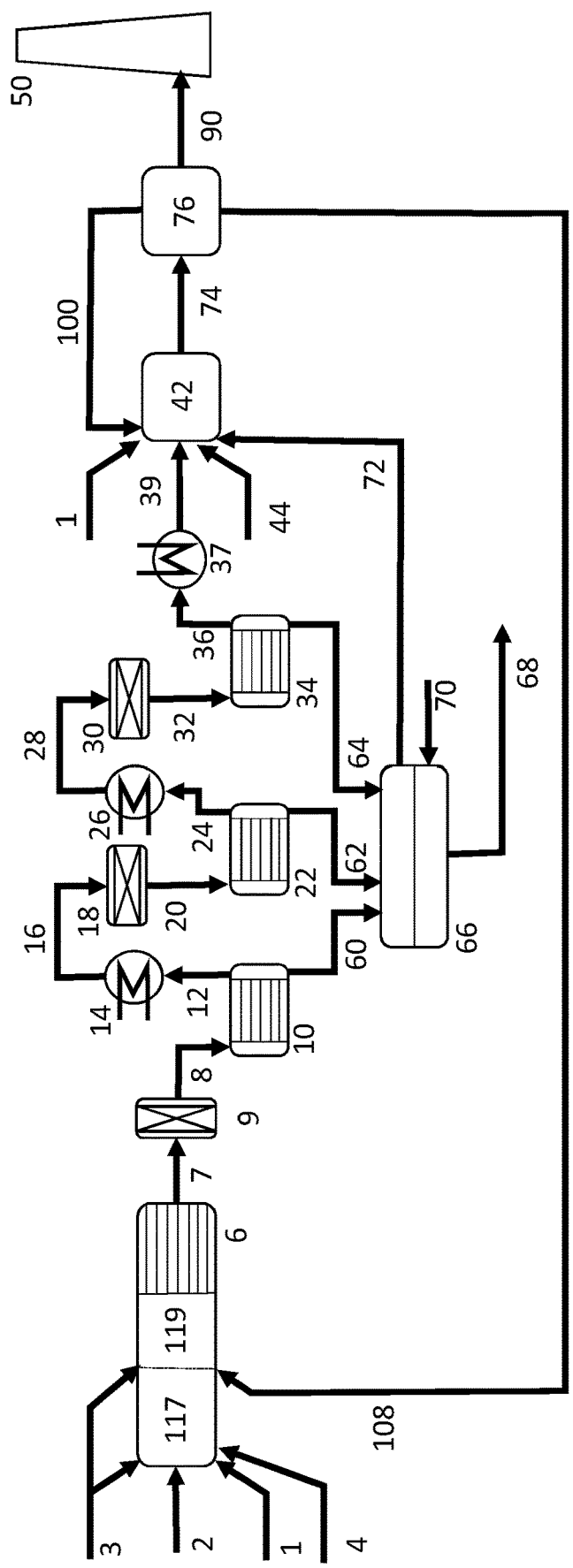

In FIG. 2 The Claus burner and reaction furnace 6 according to the present invention is shown. The Claus burner receives combustion air 2, at least a fraction of a sour gas 3 and optionally a fuel gas 4 or a SWS gas comprising $NH_3$ 1. These gases are ignited and allowed to react in the reaction furnace zone 117. In the backend of the reaction furnace zone 117, a sulfuric acid evaporation zone 119 furthermore receives a sulfuric acid stream 108 and optionally a fraction of the sour gas 3. In the backend of the sulfuric acid evaporation zone, a waste heat boiler in located, cooling the Claus reaction furnace off gas. The cooled Claus reaction furnace off gas 7 is optionally directed to a catalytic converter 9, in which a catalyst for destruction of $SO_3$ is installed. The substantially $SO_3$ free converter off gas 8, enters via line 8 the first elemental sulfur condenser 10, where elemental sulfur is condensed and withdrawn via line 60 while substantially elemental sulfur free process gas exits via line 12 to be reheated in heat exchanger 14, which also could be an in-line burner. The reheated process gas 16 enters first catalytic Claus reactor 18 in which additional elemental sulfur is formed. The converted process gas 20 then passes through second elemental sulfur condenser 22, where liquid elemental sulfur is withdrawn via line 62 and substantially sulfur free process gas exits via line 24. Typically, the process gas passes through 1-2 other reheat (26), conversion (30) and condensation (34) step(s) before leaving the Claus plant as Claus tail gas via line 36 and enters the Claus tail gas treatment plant.

The elemental sulfur lines 60, 62 and 64 are combined into a common sulfur pit 66. The sulfur pit is flushed with air 70 to release and remove vapors and the sulfur pit vent gas 72 can be directed to either the Claus burner 6 or the tail gas combustor 42. The degassed elemental sulfur product exits the Claus plant via line 68.

The Claus tail gas combustor 42, is configured to receive the optionally heated Claus tail gas 39, a fuel 44, combustion air 100 and optionally a fraction of the SWS gas 1, which is not directed to the reaction furnace zone 117. The fuel 44 could also be a fraction of the sour gas 3. The off gas from the Claus tail gas combustor is cooled and via line 74 directed to the catalytic $SO_2$ to $SO_3$ oxidation and sulfuric acid condensation steps 76, which has been described in FIG. 1. The hot air from the sulfuric acid condensation step 100 can be used in the Claus tail gas combustor 42, the sulfuric acid condenser off gas 90 is directed to the stack 50 or a plant for further reduction of $SO_2$ and/or sulfuric acid mist. The condensed sulfuric acid 108 is directed to the sulfuric acid evaporation zone 119 of the Claus burner and reaction furnace 6, optionally via an intermediate storage tank (not shown).

Figure 3:
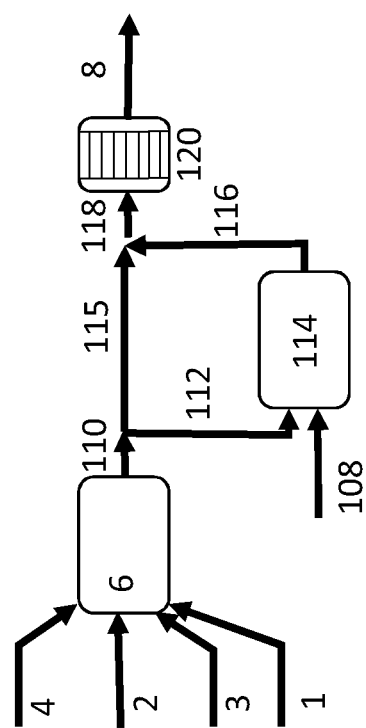

In FIG. 3, an alternative Claus burner and reaction furnace layout is shown. Sour gas 3, combustion air 2 and optionally a fuel 4 or SWS gas comprising $NH_3$ 1 is ignited in the Claus burner 6, reacting at high temperature and producing a Claus reaction furnace off gas 110. A fraction of the hot Claus reaction furnace off gas 112 is directed to a sulfuric acid evaporation chamber 114 into which a sulfuric acid stream 108 is atomized, either via hydraulic nozzle(s) or pneumatic nozzle(s). The evaporation chamber off gas 116 is then mixed with the remaining fraction of the Claus reaction furnace off gas 115 to form a mixed Claus reaction furnace off gas 118. The temperature is controlled by a heat exchanger 120 and the cooled off gas 8 is directed to the downstream Claus plant and sulfuric acid tail gas plant is described in FIG. 1.

Figure 4:
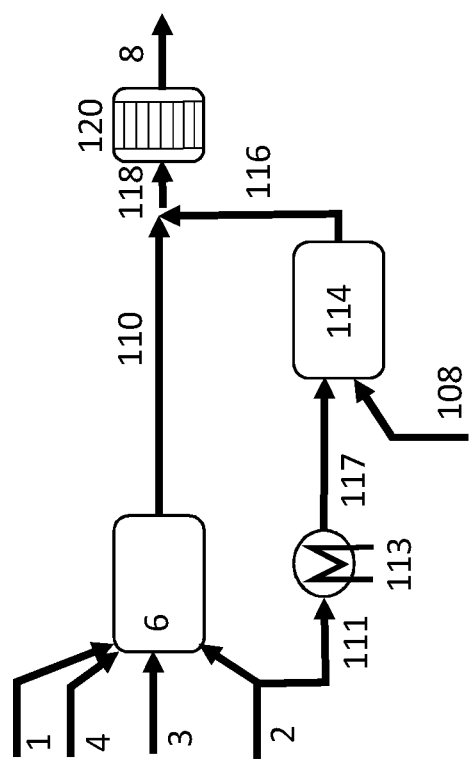
FIG. 4 shows a detail of an integrated Claus+sulfuric acid process; a Claus reaction furnace layout in which a sulfuric acid evaporation zone is separated from the reaction furnace zone as two separate chambers and hot combustion air is used as energy source for sulfuric acid evaporation.

In FIG. 4, an alternative Claus burner and reaction furnace layout is shown. A sour gas 3, an optional fuel 4 and optional SWS gas comprising $NH_3$ 1 and a fraction of the combustion air 2 is directed to the combustor 6 and ignited, producing a hot Claus reaction furnace off gas 110. The bypassed combustion air 111 is optionally heated in a heat exchanger 113, forming a hot air stream 117. Sulfuric acid 108 is atomized and mixed with the hot air stream in the evaporation chamber 114, forming an air stream with evaporated sulfuric acid 116. The air stream 116 is mixed with the Claus reaction furnace off gas 110, forming a mixed Claus reaction furnace off gas 118. The temperature is controlled by a heat exchanger 120 and the cooled off gas 8 is directed to the downstream Claus plant and sulfuric acid tail gas plant is described in FIG. 1.

Figure 5:
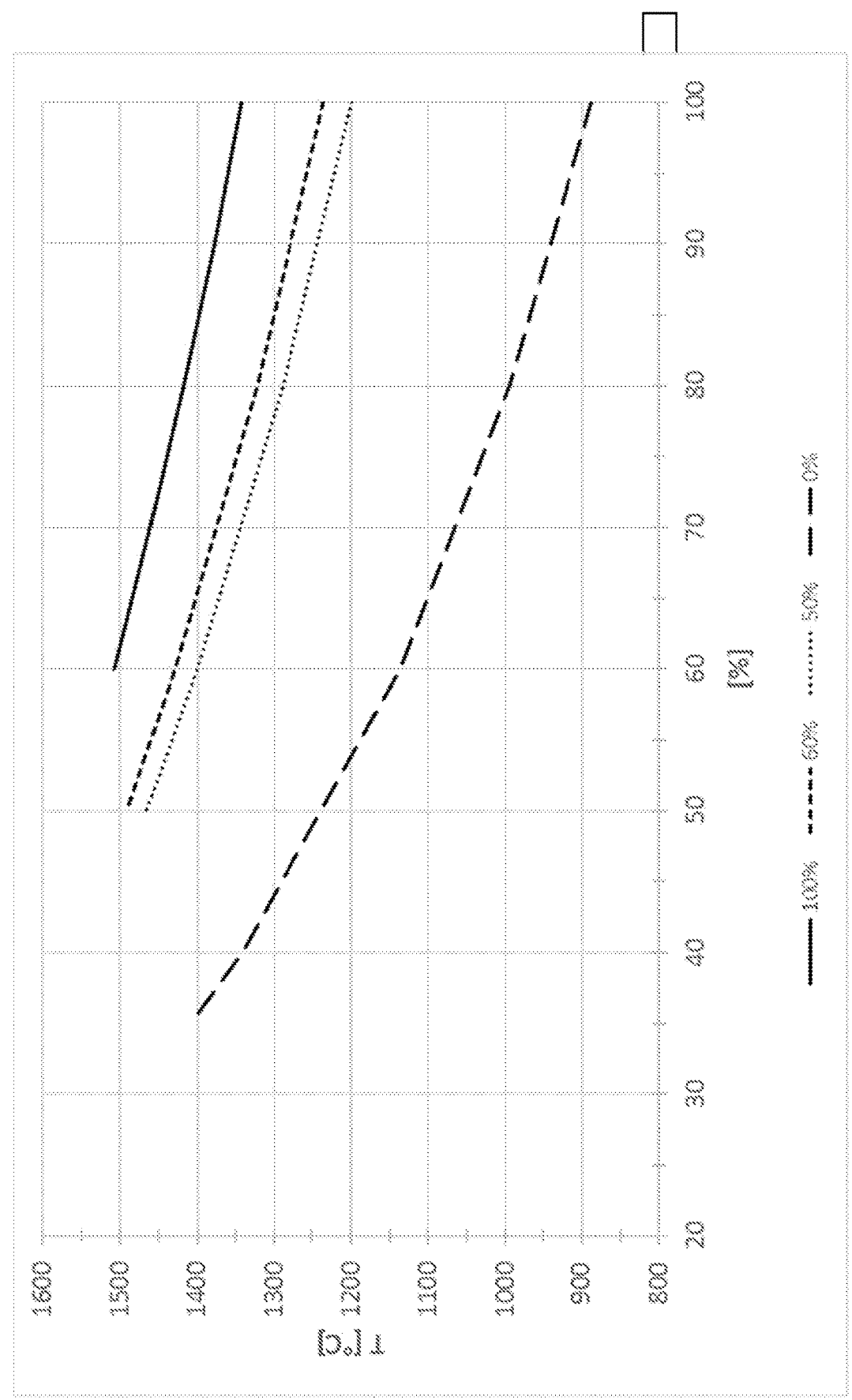
FIG. 5 shows the relationship between the temperature in the reaction furnace zone and the amount of sour gas directed to the first reaction furnace zone.

In FIG. 5, temperatures at the outlet of reaction furnace zone 117 is shown as function of the share of sour gas directed to the Claus reaction furnace, which is directed to the reaction furnace zone (vs. being directed to the sulfuric acid evaporation zone) for a number of process variations—refer to FIG. 2 for the process layout.

The Claus plant receives a SWS gas 1 and a sour gas 3. The Claus plant is configured for bypassing a fraction of the problematic SWS gas to the Claus tail gas sulfuric acid plant, where the SWS gas is unproblematic. The SWS gas to the Claus reaction furnace will be directed to the reaction furnace zone. Furthermore, the Claus reaction furnace is configured for sulfuric acid injection into the sulfuric acid evaporation zone 119 and sour gas can be directed to both the reaction furnace zone and the sulfuric acid evaporation zone. All the combustion air is directed to the reaction furnace zone.

The upper solid curve describes the situation in which all SWS gas is directed to the reaction furnace zone (100% SWS gas to RF). The temperature in the reaction zone is important for the destruction of the $NH_3$ in the process gas and it is seen that lowering the fraction of the sour gas to the first reaction furnace zone will increase the reaction temperature and thus enhance $NH_3$ destruction.

The two middle dotted curves represent operations in which a part of the SWS gas (50% and 60% SWS gas to RF respectively) is directed to the Claus tail gas sulfuric acid plant, decreasing potential $NH_3$ related problems in the Claus plant, decreasing the fuel gas consumption in the sulfuric acid plant and increases sulfuric acid production and thus sulfuric acid injection into the sulfuric acid evaporation zone. With 100% sour gas directed to the reaction furnace zone, the temperature approaches or gets below the minimum temperature for efficient $NH_3$ destruction. Bypassing a fraction of the sour gas to the sulfuric acid evaporation zone increases the temperature to secure efficient $NH_3$ destruction.

The dashed (lower) line represents the operation in which all SWS gas is directed to the Claus tail gas sulfuric acid plant, thus eliminating $NH_3$ related problems in the Claus plant. The increased sulfuric acid flow to the sulfuric acid evaporation zone result in a decrease in temperature in reaction furnace zone and thus bypassing a part of the sour gas will be necessary to ensure a high temperature in the reaction furnace zone. However, the reaction furnace zone temperature can be lowered as $NH_3$ is not present in the feed to the Claus burner.

In a further embodiment a fraction of the SWS gas may be by-passed to the Claus tail gas sulfuric acid plant to lower fuel gas consumption in the Claus tail gas combustor.

Bypassing a fraction of the SWS gas result in an increase in the sulfuric acid production and thus increase in sulfuric acid injection into the sulfuric acid evaporation zone, thus lowering the Claus reaction furnace off gas temperature.

EXAMPLE 1

Two-Zone Claus Reaction Furnace for Refinery Gas Case

To document the effect of integrating a Claus process and a sulfuric acid process, four process variations have been analyzed for the process shown in FIG. 2, in comparison with the process as shown in FIG. 1.

The example is based on the following feedstock gases:
Feed Stock Gas Rich in $H_2S$ (Stream 3):
  Total gas flow: 8190 $Nm^3/h$
  $H_2S$ concentration: 94 vol %
  $H_2O$ concentration: 6 vol %
The rich $H_2S$ gas is typical for refineries, and will also contain varying, but small, amounts of light hydrocarbons.
Feed Stock Gas Rich in $H_2S$ and $NH_3$ (Stream 1):
  Total gas flow: 3669 $Nm^3/h$
  $H_2S$ concentration: 28 vol %
  $NH_3$ concentration: 45 vol %
  $H_2O$ concentration: 27 vol %
These streams comprising $H_2S$ and $NH_3$ are typically waste gases from so-called sour water strippers and recognized as SWS-gases. They may also contain varying amounts of light hydrocarbons.

The fuel gas is natural gas, $CH_4$, directed to the Claus tail gas treatment unit Feed streams, combustion air and Claus tail gas are preheated to the extent possible by utilizing heat evolved in the combined Claus+sulfuric acid process.

In this example the Claus process operates with 95% recovery of sulfur from the feed, i.e. can be a well operated Claus plant with only 2 catalytic stages.

The sulfuric acid injection layout as depicted in FIG. 2 is compared to a Claus plant equipped with an amine based tail gas plant, which captures sulfur compounds in the form of $H_2S$ and return a $H_2S$ gas to the Claus burner and reaction furnace. The stack emissions from a Claus plant equipped with an amine based tail gas plant or a sulfuric acid plant are comparable.

The data of Example 1 are reported in Table 1, with the rows being the amount of SWS gas directed to the Claus reaction furnace, the amount of recycle (moles of S atoms, relative to S production), the temperature at the outlet of the Claus reaction furnace and the relative process gas flows out of the Claus reaction furnace, the fuel gas consumption and the process gas flow out of the Claus tail gas combustor.

EXAMPLE 1. A

In the first column of table 1, data for a Claus plant equipped with an amine based tail gas plant is shown. The 5% of total S feed recycled to the Claus reaction furnace (RF) should be understood as a $H_2S$ containing gas and not sulfuric acid, $H_2SO_4$. The reaction furnace temperature is 1400° C. The process gas flows are increased as a result of recycling the sour gas from the amine based tail gas plant and the extra combustion air needed for the partial combustion of the recycled $H_2S$. The increased process gas flow requires a larger Claus plant as the process gas flow is increased at the inlet to the Claus plant (Process gas flow outlet RF, Reaction Furnace) and the outlet of the Claus plant (Process gas from combustor, i.e. Claus tail gas combustor). The increase in fuel gas consumption is due to the increased flow to the Claus tail gas combustor.

EXAMPLE 1. B

The Claus plant base operation is characterized by the entire flow of SWS gas and sour gas being directed to the Claus burner and reaction furnace and all acid produced in the Claus tail gas sulfuric acid plant being directed to the sulfuric acid evaporation zone EXAMPLE 1.0 to 1. E In Examples 1.0 to 1. E shown in Table 1, the effect of directing a fraction of the SWS gas to the Claus tail gas combustor in the sulfuric acid plant is shown. First of all, the SWS gas will increase the sulfuric acid production, which increases the fraction of total S in the form of $H_2SO_4$ directed to the Claus plant. Bypassing all SWS gas to the sulfuric acid plant will increase the total sulfur input in the form of $H_2SO_4$ to 16%. The overall consequence of injecting sulfuric acid into the Claus reaction furnace is a temperature decrease, which is seen in row 3 (temperature outlet sulfuric acid evaporation zone). The shown temperature is at the outlet of the sulfuric acid evaporation zone (119 in FIG. 2). In FIG. 5 it was shown that the temperature in the reaction furnace zone (117 in FIG. 2) can be increased by bypassing a fraction of the sour gas to the sulfuric acid evaporation zone. If such two-zone Claus reaction furnace configuration was not used, the addition of sulfuric acid to the Claus reaction furnace would be significantly limited as the reaction furnace temperature would put a limit to the amount of sulfuric acid to be directed into the Claus reaction furnace. An alternative would be fuel addition to the Claus burner, but the related expense may eliminate the advantages of the sulfuric acid addition.

The oxygen enrichment effect of the sulfuric acid is quantified in row 4, where the total process gas to the Claus catalytic section is shown, i.e. process gas flow outlet RF. The lower process gas flow can either be used for boosting capacity of an existing plant or decrease the size of a new plant. Combining the effect of a lower process gas flow to the Claus tail gas combustor and the replacement of fuel gas with SWS gas, the fuel consumption in the overall plant decreases significantly when SWS gas is bypassed Claus the tail gas combustor. Furthermore, the process gas flow to the sulfuric acid tail gas plant (process gas from combustor) decreases as a consequence of lower tail gas flow from the Claus plant.

hydrocarbons, which require complete destruction in the reaction furnace as the hydrocarbons can cause fouling/plugging of the catalyst sections downstream the Claus reaction furnace.

The sour gas has the following composition
50 vol % $H_2S$
40 vol % $CO_2$
9 vol % $H_2O$
1 vol % $CH_4$ Combustion air is atmospheric air, preheated to 400° C. Fuel gas is pure natural gas, $CH_4$.

The Claus burner, i.e. the reaction furnace zone, is configured to receive all combustion air and, if used, all fuel gas. Sour gas will also be directed to the reaction furnace zone as high temperature is required to ensure complete destruction of the hydrocarbons the in the feed. A rule of thumb is that 1050° C. is required for complete destruction of the hydrocarbons.

TABLE 1

| | | Example | | | | | |
|---|---|---|---|---|---|---|---|
| | | 1.A | 1.B | 1.C | 1.D | 1.E | 1.F |
| SWS gas to RF (1) | % of total SWS gas | 100 | 100 | 60 | 50 | 25 | 0 |
| S recycle to Claus plant | % of total S production | 5 | 5 | 9 | 11 | 13 | 16 |
| Temperature outlet sulfuric acid evaporation zone | ° C. | 1400 | 1250 | 1030 | 950 | 740 | 450 |
| Process gas flow outlet RF (7) | % | 109 | 100 | 82 | 77 | 66 | 54 |
| Fuel gas flow to tail gas-combustor (44) | % | 108 | 100 | 51 | 41 | 14 | 0 |
| Process gas from tail gas combustor (74) | % | 109 | 100 | 83 | 79 | 69 | 65 |

EXAMPLE 2

Two-Zone Claus Reaction Furnace for Natural Gas Processing Case

To document the advantage of having two zones in the reaction furnace of the Claus plant, calculations have been carried out for a Claus burner and reaction furnace for a typical gas from a natural gas processing plant.

These gases are characterized by relatively low $H_2S$ concentration, high $CO_2$ concentration and an amount of The Claus plant is assumed to operate with ~95% efficiency in converting the sulfur species into elemental sulfur and the tail gas treatment plant captures the unconverted sulfur species and return them to the Claus reaction furnace via the sulfuric acid evaporation zone.

The results of Examples 2. A-2. G are reported in Table 2. All flows are reported relative to the base case. RF designates reaction furnace (zone) and SAE sulfuric acid evaporation (zone).

TABLE 2

| | | Base case (+5% extra AG from amine) | 100% SG to RF | 100% SG to RF + fuel gas hot RF zone | 100% SG to RF + fuel gas hot SAE zone | 95% SG to RF | 95% SG to RF + fuel gas hot RF zone | 95% SG to RF + fuel gas hot SAE zone |
|---|---|---|---|---|---|---|---|---|
| | | | | | Example | | | |
| | | 2.A | 2.B | 2.C | 2.D | 2.E | 2.F | 2.G |
| Sour gas flow to Claus RF | % of base | 105 | 100 | 100 | 100 | 95 | 95 | 95 |
| $H_2SO_4$ flow | % of base | 0 | 100 | 100 | 100 | 200 | 200 | 200 |
| RF zone temperature (117) | ° C. | 1198 | 1106 | 1192 | 1263 | 997 | 1102 | 1242 |
| SAE zone temperature (119) | ° C. | 1198 | 1034 | 1123 | 1197 | 844 | 954 | 1103 |
| Process gas flow out of RF (7) | % of base | 110 | 100 | 108 | 117 | 90 | 98 | 112 |

TABLE 2-continued

| | | Base case (+5% extra AG from amine) | 100% SG to RF | 100% SG to RF + fuel gas hot RF zone | 100% SG to RF + fuel gas hot SAE zone Example | 95% SG to RF | 95% SG to RF + fuel gas hot RF zone | 95% SG to RF + fuel gas hot SAE zone |
|---|---|---|---|---|---|---|---|---|
| | | 2.A | 2.B | 2.C | 2.D | 2.E | 2.F | 2.G |
| Process gas flow out of tail gas combustor (74) | % of base | 110 | 100 | 109 | 117 | 92 | 100 | 116 |
| Total fuel gas consumption (4 + 44) | % of base | 110 | 100 | 124 | 146 | 79 | 100 | 143 |

In Example 2. A, data from a Claus plant with amine based tail gas treatment plant is shown. All feeds are directed to the Claus burner and thus the temperatures in the two zones of the Claus reaction furnace are equal.

In Example 2. B, data from a Claus plant equipped with a sulfuric acid tail gas treatment plant is shown. The sulfuric acid is directed to the sulfuric acid evaporation zone. The temperature in reaction furnace zone is lower than in case A as part of the oxygen (and thus energy release) feed is supplied via the sulfuric acid in the sulfuric acid evaporation zone. However, the temperature is still higher than the minimum temperature for hydrocarbon destruction. The sulfuric acid addition decreases the temperature, due to the endothermal reactions related to evaporation, dehydration and dissociation of the sulfuric acid. In this example the temperature will be below the minimum temperature for hydrocarbon destruction and thus directing the sulfuric acid into the reaction furnace zone would result in an increased risk of hydrocarbon carryover to the downstream catalytic section of the Claus plant.

In Example 2. C, extra fuel gas has been directed to the Claus burner to obtain the same reaction furnace zone temperature is in Example 2. A. As seen this is possible without increasing the process gas flow through the Claus and tail gas plants, however the fuel gas consumption has increased.

In Example 2. D, fuel has been added to the Claus burner to obtain the same sulfuric acid evaporation zone temperature as in Example 2. A. An increase in both process gas flow and fuel consumption is seen. The difference between column C and D describes the difference between having a two zone Claus reaction furnace (column C) as proposed in the present disclosure compared to a single zone reaction furnace in which the sulfuric acid is directed to the Claus burner (column D). A Claus reaction furnace configured with a reaction furnace zone and a sulfuric acid evaporation zone will provide a lower process gas flow to both Claus and Claus tail gas plant, have a lower fuel gas consumption, while providing the same conditions for destruction of $NH_3$ and hydrocarbons in the feedstock gases.

Examples 2. E, 2. F and 2. G describes the Claus+tail gas configuration in which 5% of the sour gas is directed to the sulfuric acid tail gas plant, thus saving some fuel in the Claus tail gas combustor and producing twice as much acid as in the base case in Example 2. B.

The effect on directing twice as much sulfuric acid to the Claus reaction furnace is a decrease in temperatures in both reaction furnace and sulfuric acid evaporation zone. In this example the reaction furnace zone temperature is considered too low for complete hydrocarbon destruction (Example 2. E) and thus fuel gas must be added to the Claus burner to elevate the temperature. In Example 2. F, the reaction furnace zone temperature is increased, resulting in process gas flows comparable to the base case (Example 2. B). A more detailed analysis of the operation of especially the waste heat boiler downstream the Claus reaction furnace and especially the tail gas sulfuric acid plant will be required to assess which layout is to be preferred. As a general rule, the energy release in the sulfuric acid plant is of higher value than in the Claus plant as most of the energy released in the sulfuric acid plant can be recovered as saturated or superheated high pressure steam, whereas the Claus plant primarily recover excess energy as saturated steam at a lower pressure. In column G, fuel gas is supplied such that the sulfuric acid evaporation zone temperature has been increased, i.e. describing a configuration having a single reaction furnace zone. The two-zone reaction furnace configuration is characterized by a lower gas flow to both Claus and Claus tail gas plants and lower fuel gas consumption compared to the single zone configuration.

The data in Table 2 shows that a competitive Claus plant with a sulfuric acid plant is best achieved by utilizing a two zone Claus reaction furnace, in which sulfuric acid is directed to the sulfuric acid evaporation zone.

The invention claimed is:
1. A process for production of elemental sulfur from a feedstock gas comprising from 15% to 100 vol % $H_2S$ and a stream of sulfuric acid, the process comprising
   a. providing a Claus reaction furnace feed stream comprising an amount of said feedstock gas, an amount of oxygen and optionally an amount of fuel, wherein the amount of oxygen is substoichiometric with respect to the Claus reaction,
   b. directing said Claus reaction furnace feed stream to a reaction furnace zone operating at elevated temperature above 900° C., providing a reaction furnace zone product,
   c. directing said reaction furnace zone product and an amount of sulfuric acid to a sulfuric acid evaporation zone downstream said reaction furnace zone providing a Claus converter feed gas,
   d. cooling said Claus converter feed gas to provide a cooled Claus converter feed gas and optionally withdrawing elemental sulfur from the gas,
   e. directing said cooled Claus converter feed gas to contact a material catalytically active in the Claus reaction,
   f. withdrawing a Claus tail gas and elemental sulfur, optionally by cooling the effluent from said material catalytically active in the Claus reaction, and g. directing a stream comprising said Claus tail gas to a Claus tail gas treatment.

2. The process according to claim 1, wherein the temperature of the reaction furnace zone product is more than 50° C. and less than 500° C. higher than the temperature at the outlet of said sulfuric acid evaporation zone.

3. The process according to claim 1, wherein the feedstock gas is split in a reaction furnace zone feedstock directed to the reaction furnace zone and a sulfuric acid evaporation zone feedstock directed to the sulfuric acid evaporation zone.

4. The process according to claim 3, in which the ratio between the reaction furnace zone feedstock and the sulfuric acid evaporation zone feedstock is controlled to maximize the thermal destruction of impurities present in the reaction furnace zone.

5. The process according to claim 1, wherein the reaction furnace zone and/or the sulfuric acid evaporation zone comprises a turbulence enhancer.

6. The process according to claim 1, wherein the sulfuric acid evaporation zone comprises a means of impaction.

7. The process according to claim 1, wherein said Claus tail gas treatment comprises h. directing a stream comprising said Claus tail gas, oxygen and a fuel as a feedstock gas to a Claus tail gas combustor operating at a temperature above 900° C. or a catalytic means for oxidation providing an $SO_2$ converter feed gas, i. directing said $SO_2$ converter feed gas to contact a material catalytically active in $SO_2$ oxidation to $SO_3$, providing an $SO_3$ rich gas, j. converting said $SO_3$ rich gas to concentrated sulfuric acid, either by absorption of $SO_3$ in sulfuric acid or by hydration of $SO_3$, cooling and condensation of sulfuric acid, and k. recycling at least a part of the produced sulfuric acid to the sulfuric acid evaporation zone.

8. The process according to claim 1, wherein said Claus tail gas treatment comprises i. directing said Claus tail gas to a Claus tail gas combustor operating at a temperature above 900° C. or a catalytic means for oxidation providing an oxidized Claus tail gas, ii. cooling said oxidized Claus tail gas, iii. contacting the cooled oxidized Claus tail gas with hydrogen peroxide, withdrawing an amount of less concentrated sulfuric acid, iv. concentrating said less concentrated sulfuric acid by evaporation of water, and v. recycling at least a part of the produced concentrated sulfuric acid to the sulfuric acid evaporation zone.

9. The process according to claim 1, in which an amount of sulfuric acid is from a source other than a Claus tail gas treatment plant.

10. The process according to claim 1, wherein the amount of sulfur in the stream of sulfuric acid is higher than 1% and less than 25% of the total amount of elemental sulfur withdrawn from the process.

11. The process according to claim 1, wherein the concentration of said sulfuric acid is at least 80 w/w %.

12. The process according to claim 1, wherein an amount of further feedstock gas comprising 20-50% $NH_3$, 20-50% $H_2S$ and at least 80% of the balance being $H_2O$, is directed as an additional feedstock to one or both of said reaction furnace zone and said Claus tail gas treatment.

13. A process plant configured for the process of claim 1, the process plant comprising a reaction furnace zone, a sulfuric acid evaporation zone, a Claus waste heat boiler, a Claus conversion section, a means for sulfur oxidation and a sulfuric acid section, wherein the reaction furnace zone has an inlet and an outlet, the sulfuric acid evaporation zone has a gas inlet, a sulfuric acid inlet and an outlet, the Claus waste heat boiler has a gas inlet, a gas outlet and an elemental sulfur outlet, the Claus conversion section has a gas inlet, a gas outlet and an elemental sulfur outlet, the means for sulfur oxidation has an inlet and an outlet and the sulfuric acid section has a gas inlet, a gas outlet and a sulfuric acid outlet, wherein the inlet of the reaction furnace zone is configured for receiving a feedstock gas and an oxidant, wherein the outlet the reaction furnace zone is configured for being in fluid communication with the gas inlet of the sulfuric acid evaporation zone, the sulfuric acid inlet of the sulfuric acid evaporation zone is configured for receiving a stream of sulfuric acid and the outlet of the sulfuric acid evaporation zone is configured for being in fluid communication with the inlet of the Claus waste heat boiler, wherein the outlet the Claus waste heat boiler is configured for being in fluid communication with the inlet of the Claus conversion section and wherein the inlet of the means for sulfur oxidation is configured for being in fluid connection with the outlet of said Claus conversion section gas outlet, wherein the means for sulfur oxidation outlet is configured for being in fluid connection with the inlet of the sulfuric acid section, and wherein the sulfuric acid outlet of the sulfuric acid section is in fluid connection with the sulfuric acid inlet of said sulfuric acid evaporation zone.

14. The process plant according to claim 13, wherein the reaction furnace zone and the sulfuric acid evaporation zone are two separate mechanical units.

15. The process plant according to claim 13, wherein the reaction furnace zone and the sulfuric acid evaporation zone is a single mechanical unit.

16. A process plant comprising a reaction furnace zone, a sulfuric acid evaporation zone, a Claus waste heat boiler, a Claus conversion section, a means for sulfur oxidation and a sulfuric acid section, wherein the reaction furnace zone has an inlet and an outlet, the sulfuric acid evaporation zone has a gas inlet, a sulfuric acid inlet and an outlet, the Claus waste heat boiler has a gas inlet, a gas outlet and an elemental sulfur outlet, the Claus conversion section has a gas inlet, a gas outlet and an elemental sulfur outlet, the means for sulfur oxidation has an inlet and an outlet and the sulfuric acid section has a gas inlet, a gas outlet and a sulfuric acid outlet, wherein the inlet of the reaction furnace zone is configured for receiving a feedstock gas and an oxidant, wherein the outlet the reaction furnace zone is configured for being in fluid communication with the gas inlet of the sulfuric acid evaporation zone, the sulfuric acid inlet of the sulfuric acid evaporation zone is configured for receiving a stream of sulfuric acid and the outlet of the sulfuric acid evaporation zone is configured for being in fluid communication with the inlet of the Claus waste heat boiler, wherein the outlet the Claus waste heat boiler is configured for being in fluid communication with the inlet of the Claus conversion section and wherein the inlet of the means for sulfur oxidation is configured for being in fluid connection with the outlet of said Claus conversion section gas outlet, wherein the means for sulfur oxidation outlet is configured for being in fluid connection with the inlet of the sulfuric acid section, and wherein the sulfuric acid outlet of the sulfuric acid section is in fluid connection with the sulfuric acid inlet of said sulfuric acid evaporation zone.

17. The process plant according to claim 16, wherein the reaction furnace zone and the sulfuric acid evaporation zone are two separate mechanical units.

18. The process plant according to claim 16, wherein the reaction furnace zone and the sulfuric acid evaporation zone is a single mechanical unit.

* * * * *